J. S. SMITH.
CORN PLANTER ATTACHMENT.
APPLICATION FILED FEB. 12, 1910.
971,320.
Patented Sept. 27, 1910.
2 SHEETS—SHEET 1.
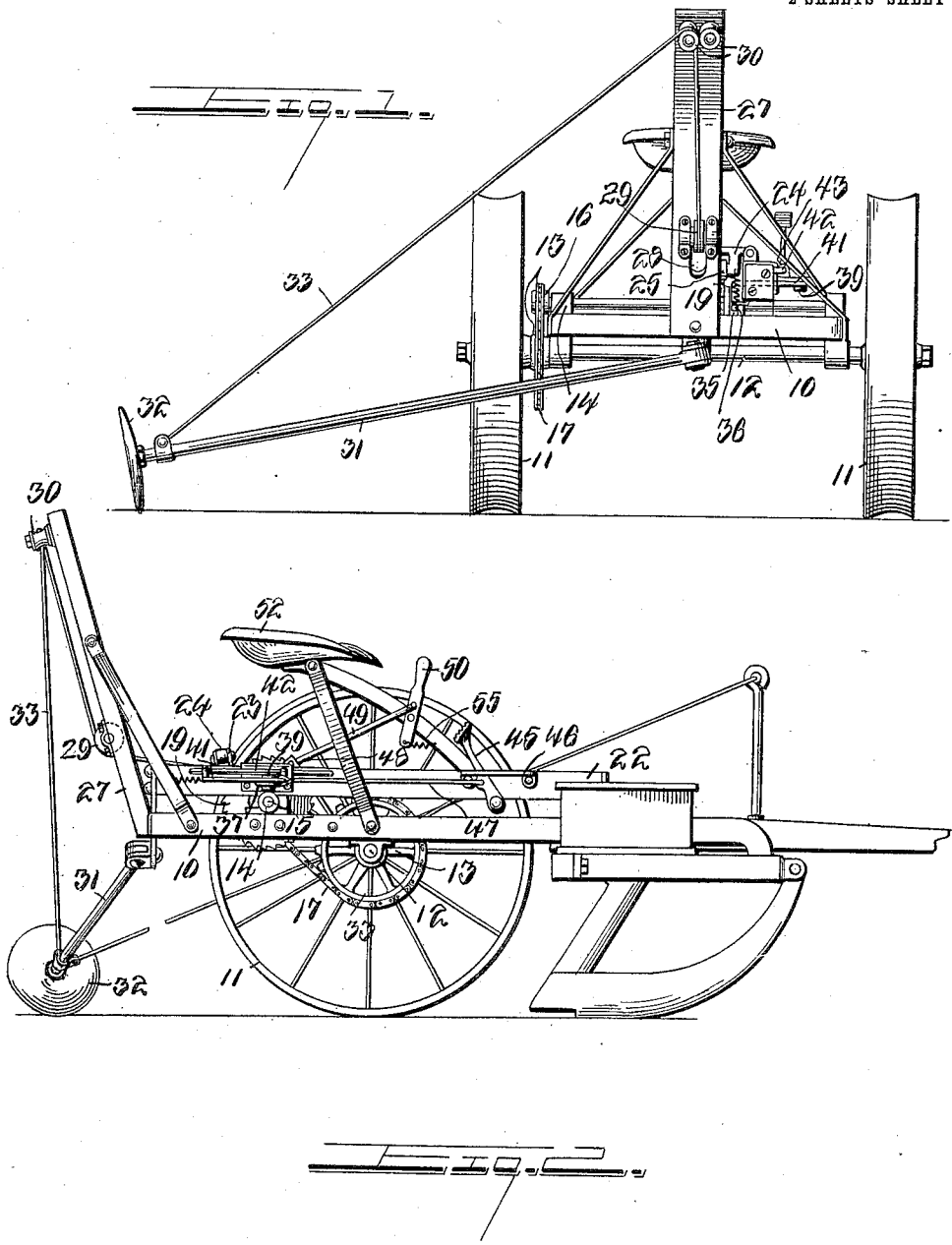
Witnesses
Gerald Hennesy.
L. N. Gillis
Inventor
John S. Smith
By
Attorneys

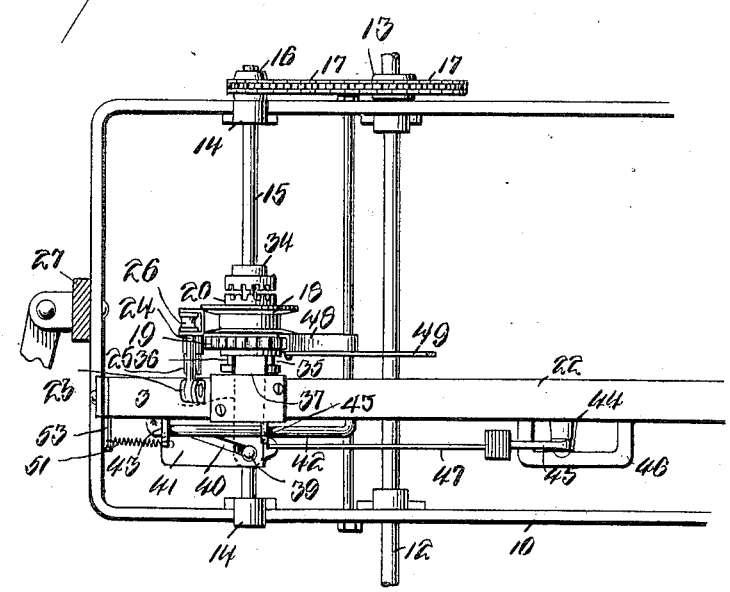

UNITED STATES PATENT OFFICE.

JOHN S. SMITH, OF REA, MISSOURI.

CORN-PLANTER ATTACHMENT.

971,320.      Specification of Letters Patent.     Patented Sept. 27, 1910.

Application filed February 12, 1910. Serial No. 543,475.

*To all whom it may concern:*

Be it known that I, JOHN S. SMITH, a citizen of the United States, residing at Rea, in the county of Andrew, State of Missouri, have invented certain new and useful Improvements in Corn-Planter Attachments; and I do hereby declare the following to be a full, clear, and exact description of the invention such as will enable others skilled in the art to which it appertains to make and use the same.

This invention relates to corn planters and has special reference to a marker attachment for corn planters arranged to lift the marker and permit it to fall to one side or the other as desired.

One object of the invention is to provide an improved general arrangement of marker mechanism for corn planters.

Another object of the invention is to provide automatic means for braking the lifting mechanism when the same is released to permit the marker to fall to operative position.

A third object of the invention is to provide a novel arrangement of clutch actuating mechanism in order to drive a winding drum arranged to lift the marker.

With the above and other objects in view the invention consists in general of an attachment for corn planters comprising a marker, improved means for raising the marker from the ground, means to brake the last mentioned means when the marker is allowed to fall, and an improved form of clutch actuating mechanism adapted to be used in connection with the raising means.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a rear elevation of a corn planter constructed in accordance with this invention, certain of the parts being omitted the better to show the attachment. Fig. 2 is a side view of a corn planter provided with this attachment, certain of the parts being omitted the better to show the attachment. Fig. 3 is a plan view of a portion of the rear end of a planter equipped with this invention. Fig. 4 is a perspective view of certain of the parts shown in Fig. 3.

The numeral 10 indicates the frame of a planter and this frame is supported in the usual manner by ground wheels 11 mounted on a suitable axle 12. One of the ground wheels has secured thereto a sprocket 13, the sprocket being arranged to rotate with the ground wheel.

Upon the frame 10 are carried bearings 14 wherethrough passes a shaft 15 provided at one end with a sprocket 16 in alinement with the sprocket 13 and connected operatively thereto by means of a sprocket chain 17. Freely rotatable on this shaft is a winding drum 18 having at one end a ratchet 19 and at the other end a clutch member 20.

Mounted above the frame is a beam 22 and upon the upper side of this beam adjacent the ratchet end of the winding drum 18 is a bracket 23 whereto is pivoted one end of a frame 24 which carries a freely rotatable roller 25 which projects over and is adapted to contact with the ratchet 19. This frame also carries a roller 26 which lies behind the drum 18. At the rear end of the frame 10 there is secured a standard 27 having an opening 28 therethrough wherein is mounted a guide sheave 29. At the upper end of the standard 27 is a pair of guide sheaves 30 arranged in opposed relation. Pivoted to the frame to swing in a vertical circle is a marker arm 31 carrying at its free end the usual marker 32 and to this marker arm is connected a flexible element in the form of a cord, rope, chain or the like, and here indicated at 33. This rope runs over one of the sheaves 30, through the opening 28 under the guide sheave 29, under the roller 26 and over and around the winding drum 18. The roller 26 is so located that when in its depressed position the rope 33 will be extended down between the winding drum and the sheave 29. The object of this is that when stress is placed on the rope as in raising the marker the roller 25 will be raised clear of the ratchet 19 so as to permit the free rotation of the drum without interference from the roller.

In order to throw the drum into and out of operative engagement with the shaft 15 there is fixed upon this shaft a clutch member 34, and the drum is provided with a boss having a shipper groove 35 extending therearound and in this groove is held the forked end 36 of a shipper 37 which passes through a suitable opening formed through the beam 22. The end of this shipper 37 opposite the forked end is provided with a pin 39 which passes upward through a diagonal slot 40 formed in a cam member 41. Carried on this beam 22 is a guide 42 which passes through ears 43 formed on the cam member 41. Mounted on the beam 22 is a boss 44 and pivoted to this boss is a lever 45 which extends downward through a suitable guide 46 on the beam 22. This lever is connected to the sliding cam 41 by a link 47 so that as the lever is moved the sliding member is moved. By means of this arrangement as the sliding member is moved in one direction or the other the cam slot 40 acts to move the pin 39 one way or the other, thus throwing the clutch in or out of gear as desired.

In order to hold the marker in raised position there is mounted on the beam 22 a pawl 48 which is engageable with the ratchet 19. This pawl is connected by means of a link 49 with a lever 50, the lever being located convenient to the operator's seat 52 and the lever 45 being also convenient to the operator as clearly shown in the drawings.

In order to retract the cam plate 41 there is provided a spring 51, one end of the spring being fastened to the plate and the other end to a suitable lug 53 carried on the beam 22. In order to hold the pawl 48 in engagement with the ratchet 19 the pawl is provided with spaced ears 54 which engage over the sides of the ratchet 19 and the lever 50 is provided with a spring 55 so connected to the lever and its supporting member or arm 56 that the pawl is normally held in engagement with the ratchet. It is, furthermore, found advisable that resilient means be employed for holding the frame 24 in its depressed position and to this end a spring 57 has one end connected to the frame 24 while the other end is connected to a pin 58 extending outward from the lower part of the beam 22.

In the operation of the device, if it is desired to raise the marker and hold the same in raised position the operator shoves the lever 45 forward, thus moving the sliding member 41 and causing the pin 39 to move in such direction as to cause the clutch members 20 and 34 to engage. As the machine is driven forward the drum 18 is rotated by means of the sprockets 13 and 16 and the chain 17 and stress is placed upon the rope 33. This causes the frame 24 to lift and raise the roller 25 clear of the ratchet 19, thus permitting the drum to revolve freely. When the marker has been raised sufficiently the operator removes his foot from the lever 45 and releases the clutch members. Meanwhile the pawl 48 is in engagement with the ratchet 19 and prevents the rotation of the drum in the direction required to unwind the rope 33 and the marker is held in this raised position. If the operator desires to drop the marker he releases the pawl 48 by pressing on the lever 50 and as the stress is removed from the rope 33 the frame 24 is allowed to fall and the roller 25 to engage with the ratchet 19. This checks the movement of the drum sufficiently so that the falling of the marker is not violent and consequently does not break either the marker or its arm. By this means the release of the drum by the pawl 48 automatically releases the frame and produces a braking effect on said drum.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In an attachment for corn planters, a marker arranged to swing in a vertical circle, and means to raise said marker including a winding drum, a ratchet on one end of said drum, a roller mounted for movement into and out of engagement with the ratchet, a flexible element connected to the marker and wound on the drum, said element being arranged to move the roller away from the ratchet as the drum is rotated to lift the marker, and releasable means to actuate the drum.

2. In an attachment for corn planters, a marker arranged to swing in a vertical circle, and means to raise said marker including a winding drum, a ratchet on one end of said drum, a pivoted frame, a roller mounted in said frame and adapted to bear against the ratchet when the frame is depressed, a flexible element connected to the marker and wound on the drum, said element being arranged to raise the roller from the ratchet as the drum is rotated to lift the marker, and releasable means to actuate said drum.

3. In an attachment for corn planters, a marker arranged to swing in a vertical circle, and means to raise said marker including a winding drum, a ratchet on one end of said drum, a frame pivoted at one end, a roller mounted toward the opposite end of said drum and adapted to bear against the ratchet when the end of the frame carrying the roller is depressed, a flexible element connected to the marker and wound on the drum, a guide sheave for said flexible element, said element extending under the roller and guide sheave and over the drum, and the roller, drum and guide sheave being positioned to flex the element when the roller is depressed whereby when the element is stressed by the rotation of the drum the roller is raised from the ratchet, and releasable means to actuate the drum.

4. The combination with a corn planter; of an attachment therefor comprising a marker pivoted to the planter to swing in a vertical circle, a shaft mounted for rotation on the planter, drive wheels supporting the planter, sprockets on one of said wheels and the shaft, a sprocket chain connecting said sprockets, a drum freely rotatable on the shaft and provided at one end with a ratchet and at the opposite end with a clutch member, a frame pivoted to the planter, a roller rotatably mounted toward the free end of said frame, a guide sheave, a flexible element wound on said drum and passing under the roller and guide sheave, a second guide sheave above the first mentioned sheave, said flexible element passing over the second guide sheave and being connected to the marker, said roller having an end adapted to bear against said ratchet when the frame is depressed, a releasable pawl engaging said ratchet, a clutch member fixed on the shaft, and means to move the drum clutch member into and out of engagement with the clutch member on the shaft.

5. The combination with a corn planter; of an attachment therefor comprising a marker pivoted to the planter to swing in a vertical circle, a shaft mounted for rotation on the planter, drive wheels supporting the planter, sprockets on one of said wheels and the shaft, a sprocket chain connecting said sprockets, a drum freely rotatable on the shaft and provided at one end with a ratchet and at the opposite end with a clutch member, a frame pivoted to the planter, a roller rotatably mounted toward the free end of said frame, a guide sheave, a flexible element wound on said drum and passing under the roller and guide sheave, said flexible element passing over the second guide sheave and being connected to the marker, said roller having an end adapted to bear against said ratchet when the frame is depressed, a releasable pawl engaging said ratchet, a clutch member fixed on the shaft, and means to move the drum clutch member into and out of engagement with the clutch member on the shaft, said means comprising a shipper having a forked end engaging the drum, a pin on the opposite end of said shipper, a sliding member provided with a cam slot engaging said pin, a quadrant fixedly mounted with relation to the planter, and a latch lever pivoted to said quadrant and operatively connected to said sliding member.

In testimony whereof, I affix my signature, in presence of two witnesses.

JOHN S. SMITH.

Witnesses:
   Woodson Coil,
   James Henson.